US011442986B2

(12) United States Patent
Gan et al.

(10) Patent No.: US 11,442,986 B2
(45) Date of Patent: Sep. 13, 2022

(54) GRAPH CONVOLUTIONAL NETWORKS FOR VIDEO GROUNDING

(71) Applicant: International Business Machines Corporation, Armonk, NY (US)

(72) Inventors: Chuang Gan, Cambridge, MA (US); Sijia Liu, Somerville, MA (US); Subhro Das, Cambridge, MA (US); Dakuo Wang, Cambridge, MA (US); Yang Zhang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/792,208

(22) Filed: Feb. 15, 2020

(65) Prior Publication Data

US 2021/0256059 A1     Aug. 19, 2021

(51) Int. Cl.
*G06F 16/78*     (2019.01)
*G06F 16/783*    (2019.01)
*G06N 3/04*      (2006.01)
*G06K 9/62*      (2022.01)
*G06F 16/75*     (2019.01)
*G06V 20/40*     (2022.01)

(52) U.S. Cl.
CPC ......... *G06F 16/7837* (2019.01); *G06F 16/75* (2019.01); *G06K 9/6263* (2013.01); *G06N 3/049* (2013.01); *G06V 20/46* (2022.01)

(58) Field of Classification Search
CPC .............................. G06F 16/7837; G06F 16/75
See application file for complete search history.

(56) References Cited

U.S. PATENT DOCUMENTS

| 2014/0067349 | A1  | 3/2014  | Oka et al.          |
| 2019/0108399 | A1  | 4/2019  | Escorcia et al.     |
| 2020/0372116 | A1* | 11/2020 | Gao ........... G06K 9/6264 |

FOREIGN PATENT DOCUMENTS

| CN | 102290082 A | 12/2011 |
| CN | 102332031 A | 1/2012  |
| CN | 105247516 A | 1/2016  |
| CN | 109903314 A | 6/2019  |

OTHER PUBLICATIONS

Ghosh S et al., "ExCL: Extractive Clip Localization Using Natural Language Descriptions", <https://arxiv.org/abs/1904.02755v1> (Apr. 4, 2019) 7 Pages.

(Continued)

*Primary Examiner* — Baoquoc N To
(74) *Attorney, Agent, or Firm* — Patterson + Sheridan, LLP (57) ABSTRACT

Method and apparatus that includes receiving a query describing an aspect in a video, the video including a plurality of frames, identifying multiple proposals that potentially correspond to the query where each of the proposals includes a subset of the plurality of frames, ranking the proposals using a graph convolution network that identifies relationships between the proposals, and selecting, based on the ranking, one of the proposals as a video segment that correlates to the query.

20 Claims, 5 Drawing Sheets

(56) References Cited

OTHER PUBLICATIONS

Culpepper S J et al.,"Top-k Ranked Document Search in General Text Databases", ESA'10: Proceedings of the 18th annual European conference on Algorithms: Part II <https://dl.acm.org/doi/proceedings/10.5555/1882123>, (<http://citeseerx.ist.psu.edu/viewdoc/download?doi=10.1.1.180.5473&rep=rep1&type=pdf>), Sep. 6-8, 2010, pp. 194-205.
Gao et al., "TALL: Temporal Activitgy Localization via Language Query," Computer Vision Foundation, 2017, 9 pages.
PCT International Search Report for Application No. PCT/IB2021/051107 dated May 17, 2021.
Xu, Huijuan et al. "Multilevel Language and Vision Integrtaion for Text-to-Clip Retrieval Computer Vision and Pattern Recognition," (cs.CV) arXiv: 1804.05113, Dec. 25, 2018 (Dec. 25, 2018) pp. 1-6.

* cited by examiner

GRAPH CONVOLUTIONAL NETWORKS FOR VIDEO GROUNDING

BACKGROUND

The present invention relates to video grounding where a query is processed to identify a corresponding segment in a video, and more specifically, to considering relationships between different segments of the video.

Video grounding searches a video to identify a segment (e.g., a plurality of consecutive video frames in the video) that correspond to a natural language query. For example, a user may want to find a particular segment in a video where a child is pushed on a swing. The user can define a query that states "CHILD ON SWING." Video grounding can use a machine learning (ML) algorithm to parse the video and identify different segments (referred to herein as proposals) in the video that may display the information described in the query (e.g., a segment of frames where a child swings on a playset). Video grounding ranks the proposals and selects the one with the highest ranking as the answer to the query. That is, current video grounding techniques consider the proposals individually when ranking them to determine which proposal best matches the natural language query.

SUMMARY

One embodiment of the present invention is a method that includes receiving a query describing an aspect in a video, the video including a plurality of frames, identifying multiple proposals that potentially correspond to the query where each of the proposals includes a subset of the plurality of frames, ranking the proposals using a graph convolution network that identifies relationships between the proposals, and selecting, based on the ranking, one of the proposals as a video segment that correlates to the query.

Another embodiment of the present invention is a system that includes a processor and memory. The memory includes a program, which when executed by the processor performs an operation, the operation includes receiving a query describing an aspect in a video, the video including a plurality of frames, identifying multiple proposals that potentially correspond to the query where each of the proposals includes a subset of the plurality of frames, ranking the proposals using a graph convolution network that identifies relationships between the proposals, and selecting, based on the ranking, one of the proposals as a video segment that correlates to the query.

Another embodiment of the present invention is computer program product for identifying a video segment that correlates to a query. The computer program product includes a computer readable storage medium having computer readable program code embodied therewith, the computer-readable program code executable by one or more computer processors to perform an operation. The operation includes receiving the query, the query describing an aspect in a video comprising a plurality of frames, identifying multiple proposals that potentially correspond to the query where each of the proposals includes a subset of the plurality of frames, ranking the proposals using a graph convolution network that identifies relationships between the proposals, and selecting, based on the ranking, one of the proposals as the video segment that correlates to the query.

DETAILED DESCRIPTION

Embodiments herein perform video grounding where various proposals (e.g., video segments) identified in response to a natural language query are ranked using a graph convolution network (GCN) that identifies relationship between the proposals. That is, in contrast to previous video grounding systems where the proposals are ranked independently (or individually), the embodiments herein construct a graph and implement a GCN that identifies temporal relationships between the proposals. In one embodiment, a GCN is designed where each node in the network represents the fusion of visual features (derived from the proposals) and query features (derived from the natural language query). Moreover, edges in the graph may be constructed according to the relationship between proposals as measured by a similarity network. By performing graph convolution, the video ground system can capture the interaction of two temporal segments as well as relationships among the proposals. Advantageously, unlike previous works which process the proposals individually and locally, the techniques describe herein perform video grounding from a global and comprehensive perspective by explicitly modeling relations among proposals, which boosts its accuracy significantly.

Figure 1:
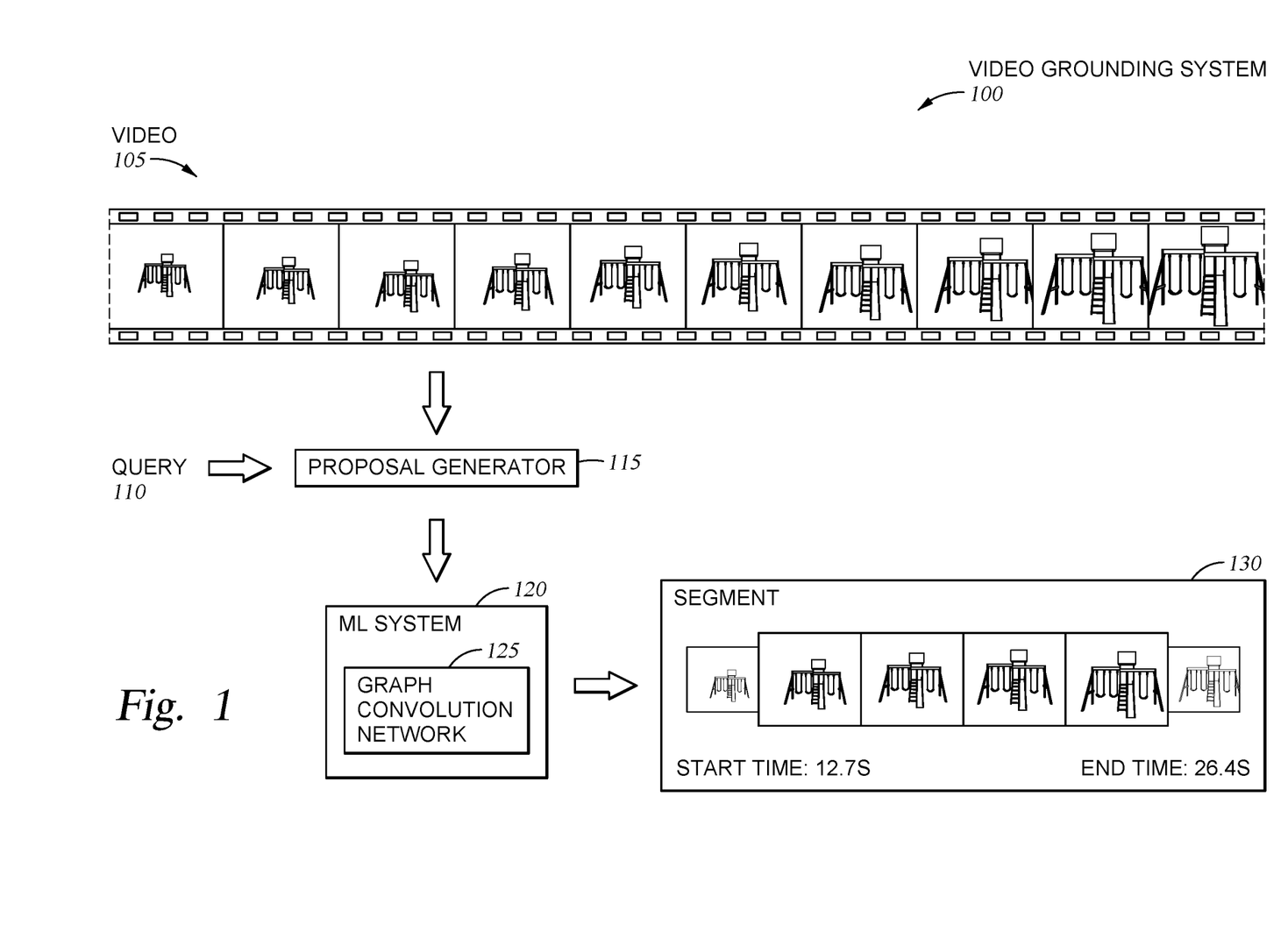
FIG. 1 illustrates a video grounding system using a convolution graph network, according to one embodiment.

FIG. 1 illustrates a video grounding system 100 using a GCN 125, according to one embodiment. Generally, the video grounding system 100 permits a user to submit a query 110 in order to identify a particular aspect of a video 105, such as a scene, action, or object in the video 105. The video 105 can include a plurality of frames that contain multiple different scenes, actions, or objects. The user may be looking for one of the scenes, actions, objects, or any other aspect in the video 105. For example, a first segment of the video 105 (e.g., a subset of consecutive frames in the video 105) may show a child's playset, a second segment of the video 105 may just show a particular feature of the playset (e.g., a built in sandbox or a slide), and a third segment of the video 105 may show a child interacting with the playset (e.g., a child being pushed on a swing of the playset or sliding down a slide). A user can use the video grounding system 100 to search the video 105 and identify a segment that correlates (or best matches) to the query 110. For example, the user may be deciding whether to purchase the playset (where the video 105 is a promotional video of the playset) and specifically wants a playset with a built-in sandbox. The user can submit a query 110 that includes the word "SANDBOX." Using the techniques discussed in detail below, the video grounding system 100 can search the video and identify the segment of the video that has a sandbox. Thus, the user can view the identified segment to determine whether the playset satisfies her criteria (i.e., has a built in sandbox), rather than having to view the entire video 105.

In another example, the user may want to see a child interacting with the playset so she can get a better idea of the scale (or size) of the playset. The user may generate a query 110 that says "CHILD USING THE SLIDE" or "CHILD BEING PUSHED ON THE SWING" which the video grounding system 100 can use to identify a segment that displays an aspect of the video (e.g., a scene, action, or object) that is described by the query 110.

The video grounding system 100 includes a proposal generator 115 that receives the video 105 and the query 110 as inputs. The proposal generator 115 can use one or more machine learning (ML) algorithms and/or video parsing techniques to identify proposals representing candidate segments in the video 105 that may depict a scene, action, or object described by the query 110. That is, if the query 110 states "CHILD SWINGING", the proposal generator 115 identifies several candidate proposals (e.g., different video segments) that the generator 115 determines may contain a child swinging.

To identify the proposals, the proposal generator 115 can use any number of image processing techniques, natural language processing techniques, or textual processing techniques (e.g., ML or otherwise). In one embodiment, the proposal generator 115 evaluates the various frames to identify a start time (or frame) and an end time for each proposal. The proposals may be overlapping (e.g., have at least some frames in common) or may be non-overlapping where each proposal has unique frames. The embodiments herein are not limited to any particular technique for generating the proposals.

The video grounding system 100 includes a ML system 120 for selecting which of the proposals generated by the proposal generator 115 is most likely a best match (or most highly correlated) with the query 110. As shown in FIG. 1, the ML system 120 receives the proposals as inputs and outputs a segment 130 that correlates to the scene, action, or object described by the query 110. Stated differently, the ML system 120 selects one of the proposals as the segment 130 which best matches the query 110. For example, the ML system 120 may output a segment 130 defined by a start time and an end time in the video 105. The segment 130 may be defined by the consecutive frames that are between the start and end times identified by the ML system 120. In one embodiment, the segment 130 is outputted to the user so that the user can view the segment 130 to hopefully view content she is most interested in without having to start the video 105 from the beginning, or manually search the video 105 by selecting random locations in the video 105.

The ML system 120 includes a GCN 125. As discussed in more detail below, the GCN 125 permits the video grounding system 100 to identify relationships between the proposals outputted by the proposal generator 115. That is, rather than treating the proposal independently, the graph convolution network 125 can identify similarities or relationships between the proposals which can advantageously improve the accuracy of the video grounding system 100—i.e., increase the likelihood that the grounding system 100 selects a segment that correlates to (or matches) the description of a scene, action, or object defined in the query 110. In one embodiment, the graph convolution network 125 ranks the proposals based on their relationships which may be more accurate than ranking the proposals independently or individually as done previously.

Further, the embodiments herein can be used with a plurality of videos rather than a single video 105 as shown. For example, the proposal generator 115 can search through multiple videos (whether in the same file or different files) to identify proposals formed from segments of those videos. These proposals can then be forwarded to the ML system 120 which identifies relationships between the proposals and ranks the proposals based on those relationships.

In one embodiment, the query 110 is a natural language query generated by a human user, but can be any query that describes an aspect of the video 105. In general, the video grounding system 100 attempts to find a segment 130 of the video 105 that is the best match to the aspect described in the query 110. The query 110 can be text, or speech which is converted into text.

Figure 2:
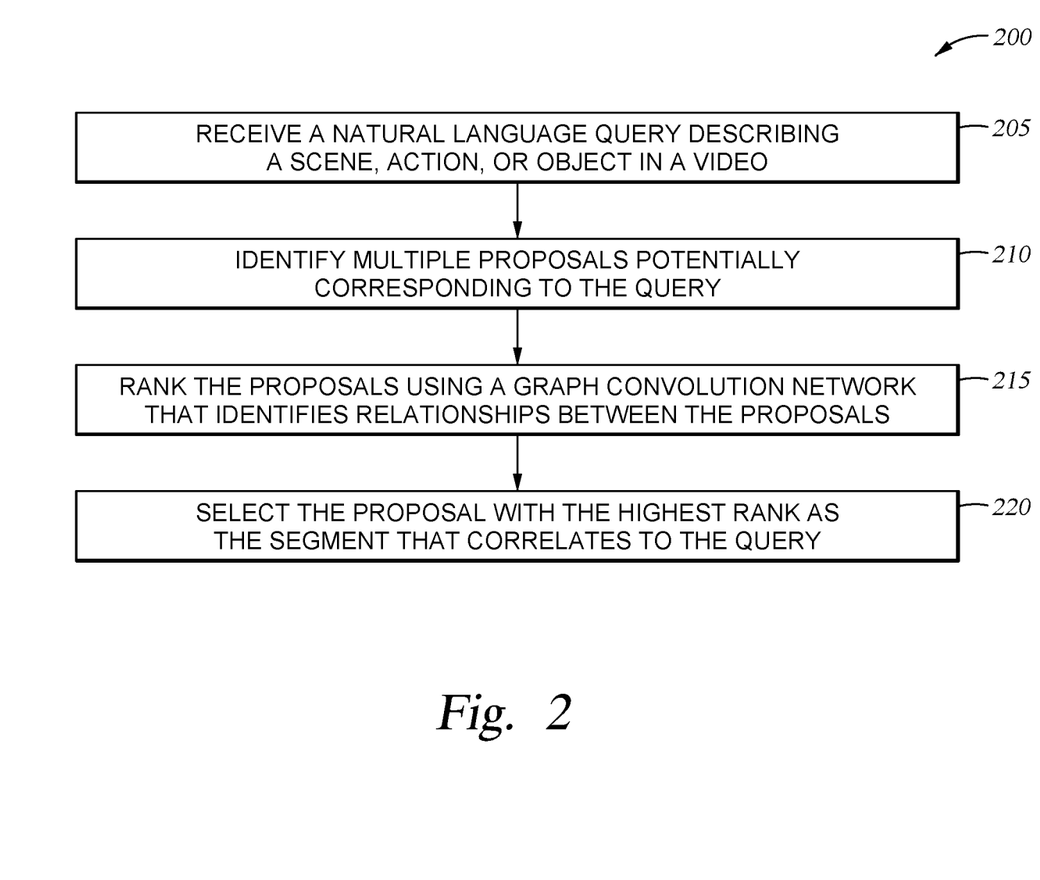
FIG. 2 illustrates a flowchart for performing video grounding, according to one embodiment.

FIG. 2 illustrates a flowchart of a method 200 for performing video grounding, according to one embodiment. At block 205, the video grounding system receives a natural language query describing a scene, action, object, or any other aspect in a video (or a series of videos). In one example, a user submits the query to instruct the video grounding system to find a segment of the video that includes the aspect defined by the query. The video grounding system can enable the user to identify a relevant segment (or segments) or search the video without having to rely on trial and error or simply playing the video from the beginning.

At block 210, the proposal generator in the video grounding system identifies multiple proposals potentially corresponding to the query. Stated differently, the proposal generator can identify different segments (i.e., subsets of the frames in the video) that it predicts correspond to the query. For example, if the query is "BARKING DOG" the proposal generator attempts to identify one or more segments in the video that show a dog barking. These segments are outputted as proposals. As discussed above, the embodiments herein are not limited to any particular technique for generating the proposals. The proposal generator can use image processing techniques and natural language techniques (which can include multiple ML algorithms) to understand the query and identify the related segments in the video.

Figure 3:
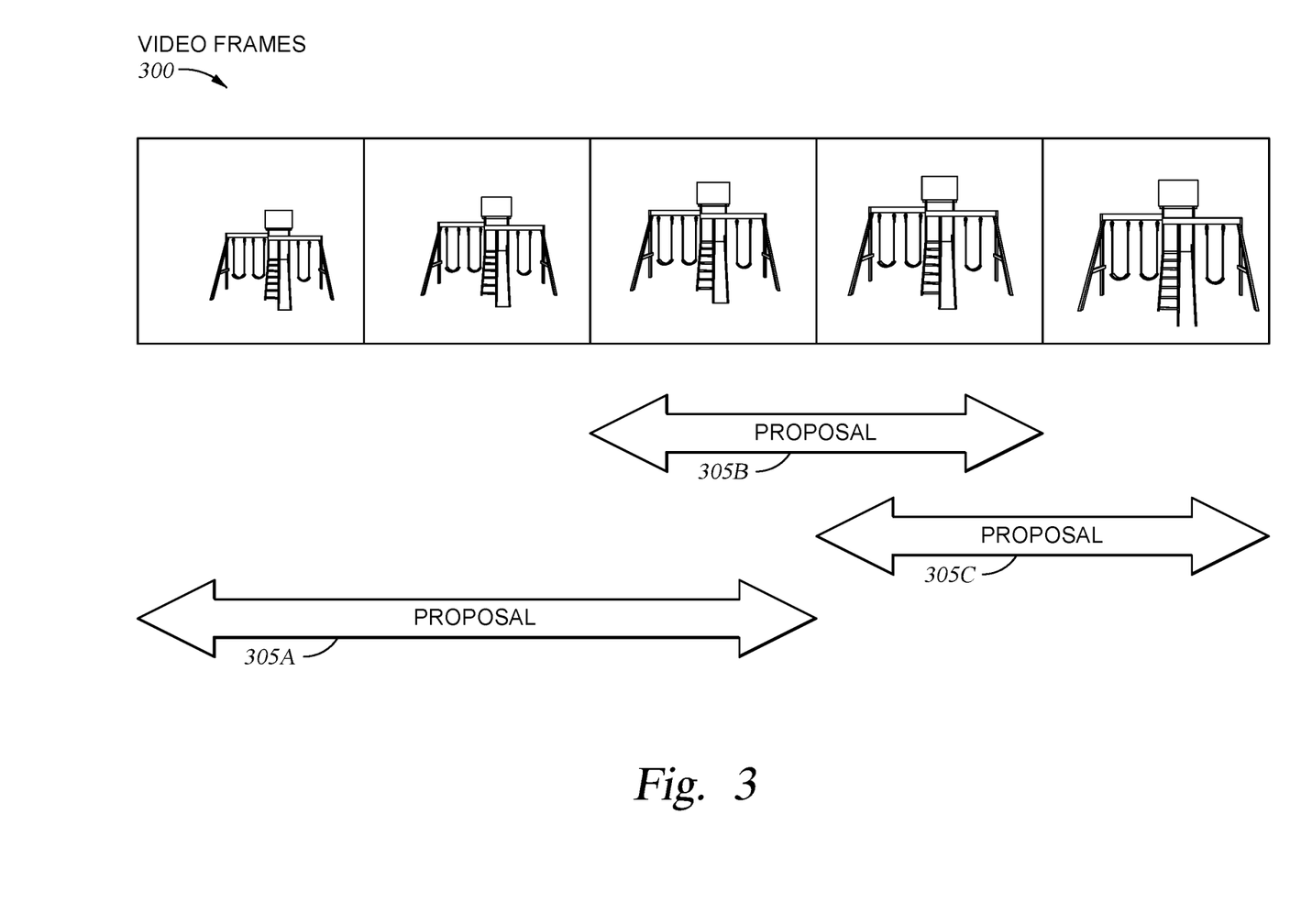
FIG. 3 illustrates identifying proposals in response to a natural language query, according to one embodiment.

FIG. 3 illustrates identifying proposals in response to a natural language query, according to one embodiment. FIG. 3 illustrates video frames 300 in a video (or a series of videos). In this example, the proposal generator receives a query and identifies three proposals 305A-C (or video segments) that may contain the aspect of the video described by the query. As shown, the proposals 305A-C overlap where at least one of the frame in proposal 305A is also included in the proposal 305B and at least one frame in proposal 305B is also in proposal 305C. These overlapping frames can establish a relationship between the proposals 305 (e.g., they have frames 300 in common). As described above, these relationships can be exploited to improve the accuracy of identifying which of the three proposals 305 may best match the query.

However, the embodiments herein can also be used when the proposals 305 do not have overlapping frames. That is, the GCN can identify temporal relationships between the proposals, even when those proposals do not have overlapping frames but have frames that are close to each other (e.g., abutting or several frames apart). By performing graph convolution, the video ground system can capture the interaction of two temporal segments as well as relationships among the proposals.

Returning to the method 200, assuming the proposal generator identifies multiple proposals, at block 215, the ML system ranks the proposals using a graph convolution network that identifies relationships between the proposals. That is, rather than ranking the proposals (or segments) independently of each other, in this embodiment, the ML system considers relationship between the proposals which can lead to significantly improved accuracy. The details of ranking the proposals are described in FIGS. 4 and 5 below.

At block 220, the ML system selects the proposal with the highest rank as the segment that correlates to the query. That is, a rank is assigned to each proposal based, at least in part, on the relationships between the frames. Thus, the rank may be more accurate than a ranking formed by evaluating the proposals individually. The video grounding system can output the proposal (or segment) with the highest ranking to the user.

Figure 4:
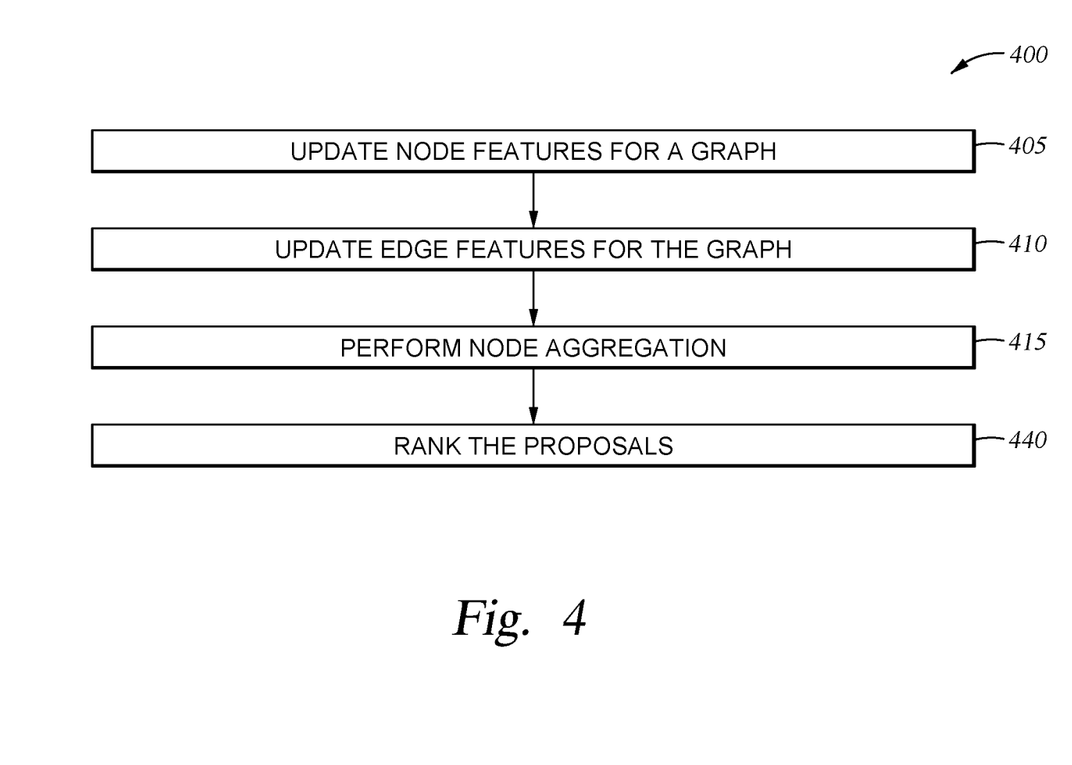
FIG. 4 illustrates a flowchart for ranking proposals using a graph convolution network, according to one embodiment.

FIG. 4 illustrates a flowchart of a method 400 for ranking proposals using a GCN, according to one embodiment. For clarity, method 400 is discussed in tandem with FIG. 5 which illustrates a ML system 120 for ranking proposals 205. The ML system 120 includes a visual feature encoder 505 which evaluates the proposals 205 and generates a feature vector for each of the proposals. The feature vector is provided to a graph constructor 515 for generating a graph that identifies the relationships between the proposals.

Figure 5:
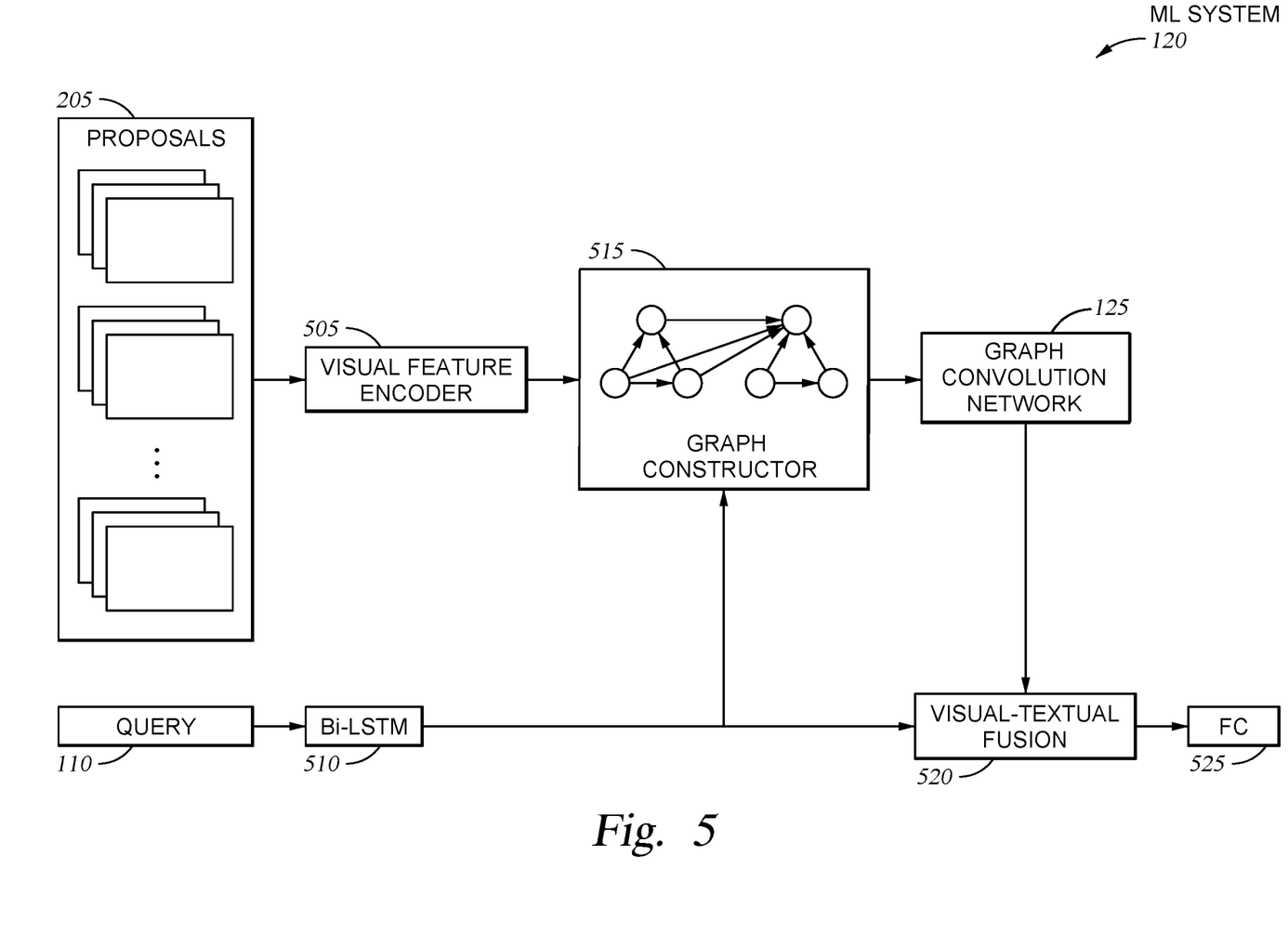
FIG. 5 illustrates a machine learning system for ranking proposals, according to one embodiment.

The ML system 120 also receives the query 110 (which is the same query 110 that was used by the proposal generator (not shown) to identify the proposals 205). That is, the query 110 is used twice in the video grounding system: once by the proposal generator to identify the proposals 205 and again by a bidirectional long short-term memory (Bi-LTSM) model 510 to perform speech recognition on the query 110. However, the embodiments are not limited to a Bi-LTSM model 510 but can be used by other types of recurrent neural networks (RNNs) or deep learning networks that can perform speech recognition on a query 110.

The output of the Bi-LTSM model 510 is provided to the graph constructor 515 which, in combination with the output of the visual feature encoder 505 generates a graph. Advantageously, by receiving both the visual features from the encoder 505 and the query features from the Bi-LTSM model 510, nodes in the graph can be a fusion of the visual and query features. Moreover, edges in the graph are constructed according to the relationships between proposals which is measured by a similarity network. In one embodiment, the similarity network measures an L2 distance when constructing the edges in the graph.

The graph (comprising of nodes and edges) generated by the graph constructor 515 is provided to the GCN 125 for execution. GCNs are a powerful neural network architecture for performing machine learning on graphs. That is, the input of a GCN 125 is a graph that can include multiple nodes that are interconnected by edges. The output of the GCN 125 is provided to a visual-textual fusion module 520 which fuses the results of the GCN 125 with the query features generated by the Bi-LTSM 510. In one embodiment, the visual-textual fusion module 520 performs feature concatenation to fuse the features identified by the GCN 125 and the Bi-LSTM—i.e., the image features and the textual/query features. The fused results are then provided to a fully connected (FC) layers 525. The FC layers 525 receives an input volume from the visual-textual fusion module 520 and outputs an N dimensional vector where N is the number of proposals. Further, the output can include a rank of the proposals.

Further, although not shown, the ML system 120 can include any number of computing devices, which can each include any number of computer processors (which can have any number of cores) and memory for executing the software components and modules illustrated in FIG. 5 (e.g., the visual feature encoder 505, Bi-LSTM 510, graph constructor 515, GCN 125, etc.).

Turning to the method 400, at block 405, the graph constructor 515 updates node features and calculates edge weight for a graph. That is, the graph constructor 515 uses the outputs of the visual feature encoder 505 (i.e., the visual features of the proposals 205) and the Bi-LTSM 510 (i.e., the query features) to generate the nodes in the graph. The nodes in the graph can be a fusion of these visual and query features.

At block 410, the graph constructor 515 updates edge features of the graph. In one embodiment, the graph constructor 515 calculates edge weights for the graph. That is, the graph constructor 515 uses the outputs of the visual feature encoder 505 (i.e., the visual features of the proposals 205) and the Bi-LTSM 510 (i.e., the query features) to generate edges in the graph. The edges (and their corresponding weights) are assigned based on the relationships between the proposals.

At block 415, the GCN 125 performs node aggregation. That is, the GCN 125 can aggregate the nodes of the graph received as an input from the graph constructor 515. The embodiments herein are not limited to any particular technique for performing node aggregation.

At block 420, the ML system 120 ranks the proposals 205. That is, the GCN 125, the visual-textual fusion module 520, the FC 525, or combinations thereof can generate weights for the proposals 205 that can be used to rank the proposals 205. These weights are generated based on the relationships between the proposals.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A method comprising:
receiving a query describing an aspect in a video, the video comprising a plurality of frames;

identifying multiple proposals that potentially correspond to the query, wherein each of the proposals comprises a subset of the plurality of frames;

generating a graph based on the query and the multiple proposals;

ranking the proposals using a graph convolution network (GCN) that identifies relationships between the proposals, wherein the graph is input into the graph convolution network; and selecting, based on the ranking, one of the proposals as a video segment that correlates to the query.

2. The method of claim 1, wherein generating the graph comprises:
identifying visual features in the proposals using a visual feature encoder; and
generating query features from the query using a recurrent neural network (RNN).

3. The method of claim 2,
wherein the graph comprises nodes and edges based on the visual features and the query features.

4. The method of claim 3, wherein ranking the proposals comprises:
updating node features for the nodes in the graph; and
calculating edge weights for the edges in the graph.

5. The method of claim 3, wherein ranking the proposals further comprises:
performing node aggregation; and
ranking the proposals based on the node aggregation and results from processing the graph using the GCN.

6. The method of claim 1, wherein at least two proposals of the multiple proposals comprise overlapping frames of the plurality of frames in the video.

7. The method of claim 1, wherein at least two proposals of the multiple proposals comprise subsets of the plurality of frames in the video that do not overlap.

8. A system, comprising:
a processor; and
memory comprising a program, which when executed by the processor performs an operation, the operation comprising:
receiving a query describing an aspect in a video, the video comprising a plurality of frames;
identifying multiple proposals that potentially correspond to the query, wherein each of the proposals comprises a subset of the plurality of frames;
generating a graph based on the query and the multiple proposals;
ranking the proposals using a GCN that identifies relationships between the proposals, wherein the graph is input into the graph convolution network; and
selecting, based on the ranking, one of the proposals as a video segment that correlates to the query.

9. The system of claim 8, wherein generating the graph comprises:
identifying visual features in the proposals using a visual feature encoder; and
generating query features from the query using a recurrent neural network (RNN).

10. The system of claim 9,
wherein the graph comprises nodes and edges based on the visual features and the query features.

11. The system of claim 10, wherein ranking the proposals comprises:
updating node features for the nodes in the graph; and
calculating edge weights for the edges in the graph.

12. The system of claim 10, wherein ranking the proposals further comprises:
performing node aggregation; and
ranking the proposals based on the node aggregation and results from processing the graph using the GCN.

13. The system of claim 8, wherein at least two proposals of the multiple proposals comprise overlapping frames of the plurality of frames in the video.

14. The system of claim 8, wherein at least two proposals of the multiple proposals comprise subsets of the plurality of frames in the video that do not overlap.

15. A computer program product for identifying a video segment that correlates to a query, the computer program product comprising:
a computer readable storage medium having computer readable program code embodied therewith, the computer-readable program code executable by one or more computer processors to perform an operation, the operation comprising:
receiving the query, the query describing an aspect in a video comprising a plurality of frames;
identifying multiple proposals that potentially correspond to the query, wherein each of the proposals comprises a subset of the plurality of frames;
generating a graph based on the query and the multiple proposals;
ranking the proposals using a GCN that identifies relationships between the proposals, wherein the graph is input into the graph convolution network; and
selecting, based on the ranking, one of the proposals as the video segment that correlates to the query.

16. The computer program product of claim 15, wherein generating the graph comprises:
identifying visual features in the proposals using a visual feature encoder; and
generating query features from the query using a recurrent neural network (RNN).

17. The computer program product of claim 16,
wherein the graph comprises nodes and edges based on the visual features and the query features.

18. The computer program product of claim 17, wherein ranking the proposals comprises:
updating node features for the nodes in the graph; and
calculating edge weights for the edges in the graph.

19. The computer program product of claim 17, wherein ranking the proposals further comprises:
performing node aggregation; and
ranking the proposals based on the node aggregation and results from processing the graph using the GCN.

20. The computer program product of claim 15, wherein at least two proposals of the multiple proposals comprise overlapping frames of the plurality of frames in the video.

\* \* \* \* \*